United States Patent
Berkeley, III et al.

(10) Patent No.: US 10,109,009 B2
(45) Date of Patent: Oct. 23, 2018

(54) SYSTEMS AND METHODS REGARDING TARGETED DISSEMINATION

(71) Applicant: ITG SOFTWARE SOLUTIONS, INC., Culver City, CA (US)

(72) Inventors: Alfred R. Berkeley, III, Baltimore, MD (US); Marcus Hooper, Purley (GB); Henri Waelbroeck, Scarsdale, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 379 days.

(21) Appl. No.: 14/282,833

(22) Filed: May 20, 2014

(65) Prior Publication Data

US 2014/0372277 A1 Dec. 18, 2014

Related U.S. Application Data

(63) Continuation of application No. 13/842,107, filed on Mar. 15, 2013, now Pat. No. 8,732,071, which is a continuation of application No. 13/330,904, filed on Dec. 20, 2011, now Pat. No. 8,412,619, which is a continuation of application No. 12/836,967, filed on
(Continued)

(51) Int. Cl.
| | |
|---|---|
| *G06Q 40/00* | (2012.01) |
| *G06Q 40/04* | (2012.01) |
| *G06Q 10/06* | (2012.01) |
| *G06Q 30/02* | (2012.01) |
| *G06Q 30/06* | (2012.01) |
| *G06Q 40/02* | (2012.01) |
| *G06Q 50/18* | (2012.01) |

(52) U.S. Cl.
CPC ......... *G06Q 40/04* (2013.01); *G06Q 10/0637* (2013.01); *G06Q 30/0239* (2013.01); *G06Q 30/0601* (2013.01); *G06Q 40/025* (2013.01); *G06Q 50/188* (2013.01)

(58) Field of Classification Search
CPC ...... G06Q 10/087; G06Q 30/08; G06Q 40/06; G06Q 40/00
See application file for complete search history.

(56) References Cited

U.S. PATENT DOCUMENTS

| | | | |
|---|---|---|---|
| 3,648,270 A | 3/1972 | Metz et al. | 345/24 |
| 5,255,309 A | 10/1993 | Katz | 379/88.09 |

(Continued)

*Primary Examiner* — Bruce I Ebersman
*Assistant Examiner* — Mark H Gaw
(74) *Attorney, Agent, or Firm* — Prince Lobel Tye LLP

(57) ABSTRACT

One exemplary aspect comprises a computer-implemented method comprising: (a) electronically receiving, from a first securities market participant, data including information related to a first order and to one or more group rankings for dissemination; (b) electronically determining with one or more processors, based on data regarding a second securities market participant and the order information and group rankings, whether the second securities market participant has a second order, on the contra side of the first order, and whether, in accordance with the group rankings, the second securities market participant is qualified to receive information about the first order; and, (c) after, and only if, the second participant is determined to be qualified, transmitting information sufficient to display to the second securities market participant the information about the first order.

7 Claims, 4 Drawing Sheets

Related U.S. Application Data

Jul. 15, 2010, now Pat. No. 8,103,579, which is a continuation-in-part of application No. 12/181,117, filed on Jul. 28, 2008, now Pat. No. 8,165,954.

(60) Provisional application No. 61/229,607, filed on Jul. 29, 2009, provisional application No. 61/043,172, filed on Apr. 8, 2008, provisional application No. 61/032,623, filed on Feb. 29, 2008, provisional application No. 60/981,242, filed on Oct. 19, 2007, provisional application No. 60/962,307, filed on Jul. 26, 2007.

(56) References Cited

U.S. PATENT DOCUMENTS

| | | | |
|---|---|---|---|
| 5,689,652 A | 11/1997 | Lupien et al. | |
| 5,842,178 A | 11/1998 | Giovannoli | |
| 5,924,082 A * | 7/1999 | Silverman | G06Q 40/00 705/35 |
| 6,505,174 B1 * | 1/2003 | Keiser | G06Q 10/063 705/1.1 |
| 8,103,579 B1 | 1/2012 | Berkeley et al. | 705/37 |
| 2003/0126068 A1 * | 7/2003 | Hauk | G06Q 30/08 705/37 |
| 2004/0177024 A1 * | 9/2004 | Bok | G06Q 40/00 705/37 |
| 2006/0036532 A1 * | 2/2006 | Silverman | G06Q 40/04 705/37 |
| 2006/0080216 A1 * | 4/2006 | Hausman | G06Q 40/04 705/37 |
| 2007/0244790 A1 * | 10/2007 | Olsson | G06Q 40/00 705/37 |
| 2009/0125431 A1 | 5/2009 | Armstrong et al. | |

* cited by examiner

SYSTEMS AND METHODS REGARDING TARGETED DISSEMINATION

CROSS REFERENCE TO RELATED APPLICATIONS

This application is a continuation of U.S. patent application Ser. No. 13/842,107, filed Mar. 15, 2013, which is a continuation of U.S. patent application Ser. No. 13/330,904, filed Dec. 20, 2011, now U.S. Pat. No. 8,412,619, issued on Apr. 2, 2013, which is a continuation of U.S. patent application Ser. No. 12/836,967, filed Jul. 15, 2010, now U.S. Pat. No. 8,103,579, issued Jan. 24, 2012, which is a continuation-in-part of U.S. patent application Ser. No. 12/181,117, filed Jul. 28, 2008, now U.S. Pat. No. 8,165,954, issued Apr. 24, 2012, which in turn claims priority to U.S. Provisional Pat. App. Nos. 61/229,607, filed Jul. 29, 2009, 61/043,172 filed Apr. 8, 2008; 61/032,623 filed Feb. 29, 2008; 60/981,242 filed Oct. 19, 2007; and 60/962,307 filed Jul. 26, 2007. Each of the above-referenced applications is hereby incorporated herein by reference in its entirety.

INTRODUCTION

Exemplary invention aspects and embodiments described herein relate generally to computer-implemented trading of securities or other items. A suitable processing system can be as disclosed in any of the patent applications cited herein, with suitable programming. For example, users may access an Order Management System or similar trading system over the Internet from personal computers running suitable software to implement a graphical user interface.

Related patents and patent applications, identified below and incorporated herein by reference, describe the use of targeted dissemination lists and electronic indications in the exchange of confidential trade interest information between securities market participants who wish to trade without leaking any of the confidential information that can have an adverse affect on the price and/or availability of a given security. Recently, the use of "dark pools" has escalated dramatically, and along with this escalation has come an increase in both the sophistication of predators seeking to "game" these pools and the number of dark pool algorithms specifically designed to mine these pools for hidden liquidity.

In light of this increased usage and the increased level of threat to the anonymous and protected nature of trading in dark pools, it is desirable to expand the ways in which users can use targeted dissemination and electronic indications to increase the level of control users have over both the specific contra-parties with whom they interact and how users' confidential trade interest information is displayed to those contra-parties.

One exemplary aspect comprises a computer-implemented method comprising: (a) electronically receiving, from a first securities market participant, data including information related to a first order and to one or more group rankings for dissemination; (b) electronically determining with one or more processors, based on data regarding a second securities market participant and the order information and group rankings, whether the second securities market participant has a second order, on the contra side of the first order, and whether, in accordance with the group rankings, the second securities market participant is qualified to receive information about the first order; and (c) after, and only if, the second participant is determined to be qualified, transmitting information sufficient to display to the second securities market participant the information about the first order.

Another exemplary aspect comprises a computer system comprising one or more processors programmed according to software stored in a tangible computer readable medium to: (a) receive over a computer network, from a first securities market participant, data including information related to a first order and to one or more group rankings; (b) determine, based on data regarding a second securities market participant and the order information and group rankings, whether the second securities market participant has a second order, on the contra side of the first order, and whether, in accordance with the group rankings, the second securities market participant is qualified to receive information about the first order; and (c) after, and only if, the second participant is determined to be qualified, transmitting information sufficient to display to the second securities market participant the information about the first order.

In various exemplary embodiments: (1) the one or more group rankings for dissemination remain the same for each of the first securities market participant's orders; (2) the one or more group rankings for dissemination remain the same for each of the first securities market participant's orders trading the same security as the first order; (3) the group rankings for dissemination are constructed from a list of actual participant names; and (4) the group rankings for dissemination are constructed from a list of anonymous labels for participants.

DETAILED DESCRIPTION OF CERTAIN ASPECTS AND EMBODIMENTS

Aspect 1 relates to an extension of the targeted dissemination covered by applications U.S. patent application Ser. Nos. 09/750,768, 10/310,345 and 12/181,117, the entire contents of each which are incorporated herein by reference. In this Aspect, the system takes control over which traders/firms receive a targeted dissemination of information from a broker/dealer and gives that control to a buy side user, thereby enabling the buy side user to manage the distribution of even the smallest pieces of confidential order information.

Figure 1:
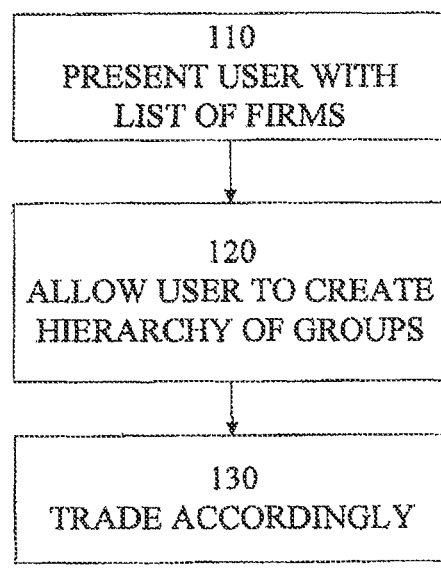
FIG. 1 depicts exemplary steps of Aspect 1.

In an exemplary embodiment, users of the system are provided with a list of n firms. See step 110, FIG. 1. In an exemplary embodiment this list contains both sell side and buy side firms and is limited to actual users of the subject system; however, in other embodiments this list may be limited to only sell side firms, or only buy side firms. In additional embodiments, this list may include any number of sell side and/or buy side firms and is not limited to actual users of the subject system. In an exemplary embodiment the list of firms contains actual firm names; however, in other embodiments this list could include anonymous representations of the firms—for example, numbers combined with firm characteristics.

In an exemplary embodiment, a user may use this list of firms to create a hierarchical system that comprises groups of firms ranked according to the order in which the user wants to disseminate confidential trade interest information. See step 120, FIG. 1. For example, Group 1 may be a firm or set of firms that the user wants to target first with confidential trade interest information; Group 2 a firm or set of firms the user is willing to target second in the event no contra parties are located in Group 1; Group 3 a firm or set of firms the user is willing to target in the event no contra parties are located in Group 2; and so forth.

In an exemplary embodiment, a user has full control over the creation of the firm groups and can create as many groups as needed to satisfy the range of firms with whom he would be willing to trade and can use any criteria to create the groups. In an exemplary embodiment the user can also associate additional criteria with the rankings such that a firm's ranking can change automatically based on the trading scenario.

In other embodiments the subject system plays a role in the creation of the groups, either by giving the user selection criteria which he uses to create the groups or by offering the user pre-established groups to which he can assign rankings. These exemplary embodiments are only intended to be examples of ways in which the subject system may assist the user in the creation of the dissemination groups; many other methods will be understood by those skilled in the art to be within the scope of the present invention.

In an exemplary embodiment, once a user has created his firm group rankings, the subject system then uses those rankings as the first criteria in the targeted dissemination of the user confidential trade interest information, such that the subject system only seeks potential matches with firms who meet the ranking criteria for a given order along with any other dissemination criteria established by the user. See step 130, FIG. 1. In other exemplary embodiments, the system considers group rankings after, or in parallel with, other targeting criteria.

In an exemplary embodiment, the subject system's application of the group rankings is consistent across all of a given user's orders, such that for a particular user, the members of each firm group (e.g., group 1, group 2, and group 3) are always the same for every order. In other embodiments, the subject system's application of the group rankings is dynamic, thereby enabling a user to choose among a selection of group rankings (e.g., large cap rankings, small cap rankings, etc.) on an order by order basis. These embodiments are useful to a trader who has a range in the number or types of firms he is willing to target depending on the order and/or current trading environment.

In yet another exemplary embodiment, the user associates one of a range of firm group rankings with each symbol he trades, such that the subject can automatically apply the appropriate firm group ranking based on the symbol being traded. In various embodiments the user may have an option to manually override the ranking criteria for any order to ensure that he can prevent the distribution of information on any order at any point in time.

Aspect 2 also is an extension of the targeted dissemination covered by U.S. patent application Ser. Nos. 09/750,768, 10/310,345 and 12/181,117." This aspect preferably enhances the firm group rankings enabled in Aspect 2 by combining the subject system's ability to collect and store users' confidential trade interest information with a user directed rating system that allows users to score their counterparties on each trade.

Figure 2:
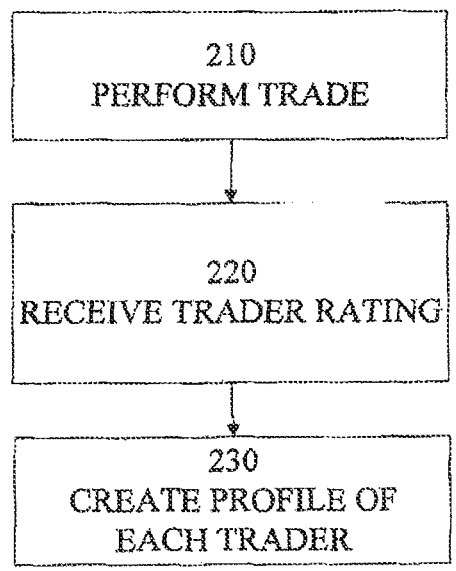
FIG. 2 depicts exemplary steps of Aspect 2.

In an exemplary embodiment, a user is presented with a window after each trading experience (be it an execution, negotiation, cancellation, broken trade, etc.) that gives him the option of scoring the experience according to some scale, for example 1 to 5 stars, 1 star being a terrible experience and 5 being a fantastic experience. Because the system is anonymous, a user never knows the identity of the counterparty he is scoring, but with its ability to collect and store confidential information, the subject system does know the identity of the user on both sides of the trade. As a result, the subject system preferably can associate each score with the actual user being scored (at both the trader and firm levels) and over time can develop a "rating profile" for each user (and firm) on the system. See FIG. 2, steps 210-230.

In an exemplary embodiment, the subject system waits a certain period of time (for example, six months) before a user's rating profile can be used by other users as a filtering criterion to ensure that every user is given an adequate amount of time to develop an accurate profile. Then, once the subject system attributes a rating profile to a given trader/firm, a user can decide to add that rating profile as an additional filter in his firm group rankings.

While an individual user preferably never knows another firm's rating or another individual's rating, if a user chooses to add rating profile as a filtering criterion, when the system goes to target the dissemination of the user's confidential trade interest information according to the firm group rankings, firms whose composite rating profile (the average of all traders associated with that firm) does not meet the user's criteria will be eliminated from the list.

In an exemplary embodiment the rating profile is applied at the firm level. However, in other embodiments the rating profile can also be applied at the trader level, such that a user can filter out a firm with even one trader that falls below a certain rating, rather than having to rely on the average of the ratings of all of the individuals in a firm.

Preferably all of the trading and all of the rankings on the subject system are anonymous, and a trader does not know who he is rating on a given trade, or which firms are filtered out because of the rating system. However, what a trader does know is that the rating system adds another layer of control over the potential counterparties who receive notifications regarding his confidential trade interest information, as well as an additional layer of security, knowing that he is limiting his trading pool to other "good guys" who are there to trade on, and not to game, the system. In addition, the rating system is also designed to serve as a self-policing mechanism that both deters bad behavior and over time weeds out the firms and traders who consistently trade in an inappropriate manner.

Aspect 3 also is an extension of the targeted dissemination covered by U.S. patent application Ser. Nos. 09/750,768, 10/310,345 and 12/181,117. This aspect preferably provides traders with an option for off-setting the reduced levels of communication between counterparties that results from the anonymous and highly "secluded" nature of trading in dark pools, particularly those with highly developed filtering mechanisms such as those described above regarding Aspects 1 and 2.

Historically, traders have been highly social and highly competitive. Before the dominance of electronic trading, trading floors and trading desks were crowded, brimming with a strong sense of community and filled with camaraderie and competitive spirit. For better or worse, as the percentage of trades executed on electronic, anonymous venues continues to increase, traders are increasingly isolated from their fellow traders.

Figure 3:
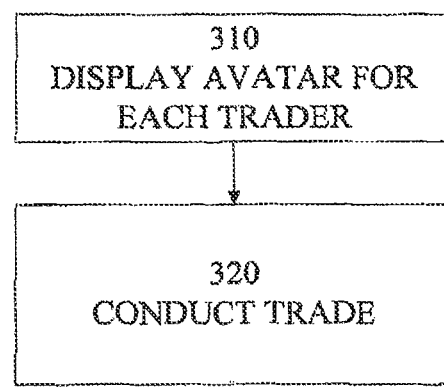
FIG. 3 depicts exemplary steps of Aspect 3.

In an effort to offset the negative effects of this isolation, the subject system enables traders to use avatars. See FIG. 3, steps 310-320. Traders may use these avatars to take on an identity that can be displayed in a dark pool, enabling users to get to "know" the community of users—how various users trade, what different users trade, how often they trade, who is a good counter party, who is fair, etc.—without compromising the anonymous nature of the trading environment. In addition, these avatars help bring the camaraderie, the competition, and the sense of community that has always characterized trading floors to the experience of trading in dark pools.

Aspect 4 also is an extension of the targeted dissemination covered by U.S. patent application Ser. Nos. 09/750,768, 10/310,345 and 12/181,117. This aspect utilizes the targeted disseminations enabled by the applications listed above to gather and document information related to the confidential trade interest information revealed by the targeted dissemination. More specifically, in instances where a user receives an electronic notification related to a targeted dissemination, the user is unable to close or disregard the electronic notification after he has seen it—instead, he must interact with that electronic notification in some way in order to close the electronic notification.

Figure 4:
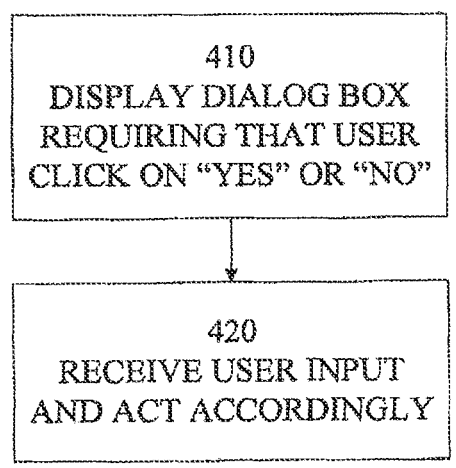
FIG. 4 depicts exemplary steps of Aspect 4.

For example, in an exemplary embodiment, instead of just clicking an "x" in the corner of the notification to close the notification, a user would need to click a button or a symbol indicating whether or not he is open to receiving more electronic notifications for the same symbol. See step 410, FIG. 4.

In other embodiments, in order to close the notification, a user must indicate whether he would be interested in receiving proprietary research about the stock in question or other related stocks.

As the subject system receives and records the "close notification" responses, it develops an historic record of all of the "close notification" responses on the system and is able to use that information to further manage and target the distribution of confidential trade interest information. In addition, the subject system may apply that historic record of "close window" responses to the development and distribution of related information or materials (for example, research related to the symbols traded by various users on the system). See step 420, FIG. 4.

An additional exemplary embodiment comprises a computer-implemented method for trading securities and/or other items, the method comprising the steps of: (a) maintaining, in a server, a list of traders in the items; (b) presenting to a user a computer interface including the list of traders; (c) receiving from the user, through the computer interface, a hierarchy of groups of the traders; and (d) automatically executing trades between the user and the traders in the server or in a trading system in communication with the server, the trades being prioritized in accordance with the hierarchy of groups.

In one or more related embodiments: (1) the hierarchy of groups comprises a first group that the user wants to target first; and at least one following group that the user is willing to target if no contra parties are located in a preceding group; (2) the hierarchy of groups is formed manually by the user; and (3) the hierarchy of groups is formed semi-automatically.

Another exemplary embodiment comprises a computer-implemented method for trading securities and/or items, the method comprising steps of: (a) maintaining, in a server, a list of traders in the items; (b) automatically executing trades among the traders in the server or in a trading system in communication with the server; (c) for each of the trades, receiving into the server a rating of the trade from each trader involved in the trade; and (d) automatically forming, in the server, a rating for each of the traders in accordance with the ratings received in step (c).

In one or more related embodiments: (1) step (c) is performed anonymously; and (2) the method further comprises automatically excluding traders from trades in accordance with the ratings formed in step (d).

Another exemplary embodiment comprises a computer-implemented method for trading securities and/or items, the method comprising steps of: (a) maintaining, in a server, a list of traders in the items and an avatar associated with each of the traders; (b) presenting to each of the traders a computer interface including the avatars of others of the traders; (c) receiving orders from the traders through the computer interface presented in step (b); and (d) automatically executing trades among the traders in the server or in a trading system in communication with the server.

Another exemplary embodiment comprises a computer-implemented method for trading securities and/or items, the method comprising steps of: (a) presenting to a user a computer interface comprising an electronic notification relating to a targeted dissemination; (b) not permitting the user to proceed until the user has made an indication of a preference regarding the electronic notification; (c) receiving the indication through the computer interface; and (d) automatically providing more information to the user through the computer interface in accordance with the indication.

Other embodiments comprise computer systems and software configured to perform the above methods. While various aspects and embodiments are described above, those skilled in the art will readily appreciate that other aspects and embodiments are within the scope of the invention. For example, inventions, aspects, embodiments, and/or variations disclosed separately can be combined in any manner, while those disclosed as usable together may be used separately. Further, each separate mention herein of an exemplary or other embodiment should be understood to potentially, but not necessarily, refer to a separate embodiment.

The scope of the present invention is intended to be limited only by the claims in the form in which they issue, and not by any specific features described above with respect to particular aspects and/or embodiments.

What is claimed is:

1. A computer system for electronically controlling dissemination of confidential electronic data among a plurality of disparate electronic trading systems, the computer system comprising:

a server computer including a processor programmed according to software stored in a non-transitory computer readable medium, the processor coupled to an electronic communications interface in electronic communications with an electronic communications network, the processor configured to:

electronically receive, over the electronic communications network via the communications interface, a first electronic communications message from a first remote electronic communications interface, the first electronic communications message comprising confidential electronic data associated with a first participant in said electronic communications network;

electronically receive, over the electronic communications network via the communications interface, a second electronic communications message from the first remote electronic communications interface, the second electronic communications message comprising data on a ranking criteria, wherein said ranking criteria comprises an ordered set of one or more groups of electronic counterparty participants in said electronic communications network that are qualified to receive said confidential electronic data;

determine that a counterparty participant in said electronic communications network meets the ranking criteria;

in response to the determining, electronically transmit, over the electronic communications network via the communications interface, a third electronic communications message to a second remote electronic communications interface associated with said counterparty participant in said electronic communications network, the third electronic communications message comprising the confidential electronic data;

electronically generate a notification for display on a graphical user interface associated with said second remote electronic communications interface; and electronically receive, over the electronic communications network via the communications interface, a fourth electronic communications message from said second remote electronic communications interface, the fourth electronic communications message comprising a selection of whether the counterparty participant is open to receiving more notifications associated with said confidential electronic data.

2. The computer system of claim 1, the processor further configured to: automatically execute an electronic transaction between said first participant and said counterparty participant based on said confidential electronic data.

3. The computer system of claim 1, the processor further configured to:

electronically receive, over the electronic communications network via the communications interface, a fourth electronic communications message from the first remote electronic communications interface, the fourth electronic communications message comprising second confidential electronic data associated with said first participant in said electronic communications network;

determine that a second counterparty participant in said electronic communications network meets the ranking criteria; and, electronically transmit, over the electronic communications network via the communications interface, a fifth electronic communications message to a third remote electronic communications interface associated with said second counterparty participant in said electronic communications network, the fifth electronic communications message comprising the second confidential electronic data.

4. The computer system of claim 1, further configured to:

electronically receive, over the electronic communications network via the communications interface, a fourth electronic communications message from the first remote electronic communications interface, the fourth electronic communications message comprising second confidential electronic data associated with said first participant in said electronic communications network;

electronically receive, over the electronic communications network via the communications interface, a fifth electronic communications message from the first remote electronic communications interface, the fifth electronic communications message comprising data on a second ranking criteria, wherein said second ranking criteria comprises a second ordered set of one or more groups of electronic counterparty participants in said electronic communications network that are qualified to receive said second confidential electronic data;

determine that a second counterparty participant in said electronic communications network meets the second ranking criteria; and, electronically transmit, over the electronic communications network via the communications interface, a sixth electronic communications message to a third remote electronic communications interface associated with said second counterparty participant in said electronic communications network, the sixth electronic communications message comprising the second confidential electronic data.

5. The computer system of claim 1, the processor further configured to:

electronically receive, over the electronic communications network via the communications interface, a fourth electronic communications message from said first remote electronic communications interface, the fourth electronic communications message comprising a selection of a first avatar associated with said first participant;

electronically receive, over the electronic communications network via the communications interface, a fifth electronic communications message from said second remote electronic communications interface, the fifth electronic communications message comprising a selection of a second avatar associated with said counterparty participant;

electronically generate a display comprising said first and second avatar for display in a graphical user interface associated with one or more remote devices.

6. The computer system of claim 4, the processor further configured to: encode the first and second avatars with identifications that do not compromise an anonymous nature of the electronic communications network.

7. The computer system of claim 1, the computer system further comprising:

a plurality of counterparty electronic communications interfaces, each counterparty electronic communications interface comprising an input/output device and a display, each said electronic communications interface being in electronic communications with said electronic communications network, and each counterparty electronic communications interface is configured to receive as input confidential information from a first participant via its input/output device, to generate the first electronic communications message comprising the confidential electronic data input, and to transmit said first electronic communications message to said server via said electronic communications network; and configured to receive the second electronic communications message from said server via said electronic communications network and display within a display area on said display, the confidential electronic data from said second electronic communications message.

* * * * *